United States Patent [19]

Kronstadt

[11] 4,050,706
[45] Sept. 27, 1977

[54] SKI CARRY

[76] Inventor: Rachel Kronstadt, 8781 Pierce Way No. 102, Arvada, Colo. 80003

[21] Appl. No.: 570,379

[22] Filed: Apr. 22, 1975

[51] Int. Cl.² .......................................... B62B 13/00
[52] U.S. Cl. ............................ 280/12 R; 211/60 SK; 224/29 R; 280/7.1; 280/11.37 K; 280/12 C
[58] Field of Search ............... 224/42.32, 42.34, 42.36, 224/42.38, 42.4, 29 R, 42.01, 42.1 D, 42.1 G, 42.1 F, 45 S; 296/3; 211/60 SK, 4, 8, 60 R, 60 T; 280/11.37 R, 11.37 K, 11.37 A, 12 R, 12 C, 12 E, 12 F, 18, 19, 11.37 J, 12 A, 12 H, 12 S, 15, 20, 7.1

[56] References Cited

U.S. PATENT DOCUMENTS

| 844,915 | 2/1907 | Boole et al. ................... 211/60 R X |
| 2,234,487 | 3/1941 | Davis ............................. 224/45 S X |
| 2,316,456 | 4/1943 | Robes ............................ 280/12 F X |
| 3,527,354 | 9/1970 | Sokolow ........................ 211/60 SK |
| 3,610,491 | 10/1971 | Bott ................................ 224/29 R |
| 3,719,297 | 3/1973 | Nowicki ....................... 224/42.1 F X |
| 3,740,065 | 6/1973 | Greene ................................... 280/19 |
| 3,806,146 | 4/1974 | Shaw ................................... 280/12 C |
| 3,820,805 | 6/1974 | Tuomala ............................ 280/12 S |
| 3,921,998 | 11/1975 | Broughton ............................ 280/19 |
| 3,924,871 | 12/1975 | Mesenbring .......................... 280/19 |
| 3,945,497 | 3/1976 | Greenberg ........................ 211/60 R |

Primary Examiner—Robert J. Spar
Assistant Examiner—Winston H. Douglas
Attorney, Agent, or Firm—Browdy and Neimark

[57] ABSTRACT

A ski tow for use in transporting skis, packages or other miscellaneous articles in areas where travel by automobile or snowmobile is hazardous or inconvenient has been developed. This tow consists of two ski runners which serve as the base of the device and which therefore allows the tow to travel on ice or snow. Several carrying devices such as a ski rack or a package container are removably attached to an upright frame affixed to the ski runners.

6 Claims, 4 Drawing Figures

U.S. Patent    Sept. 27, 1977    4,050,706
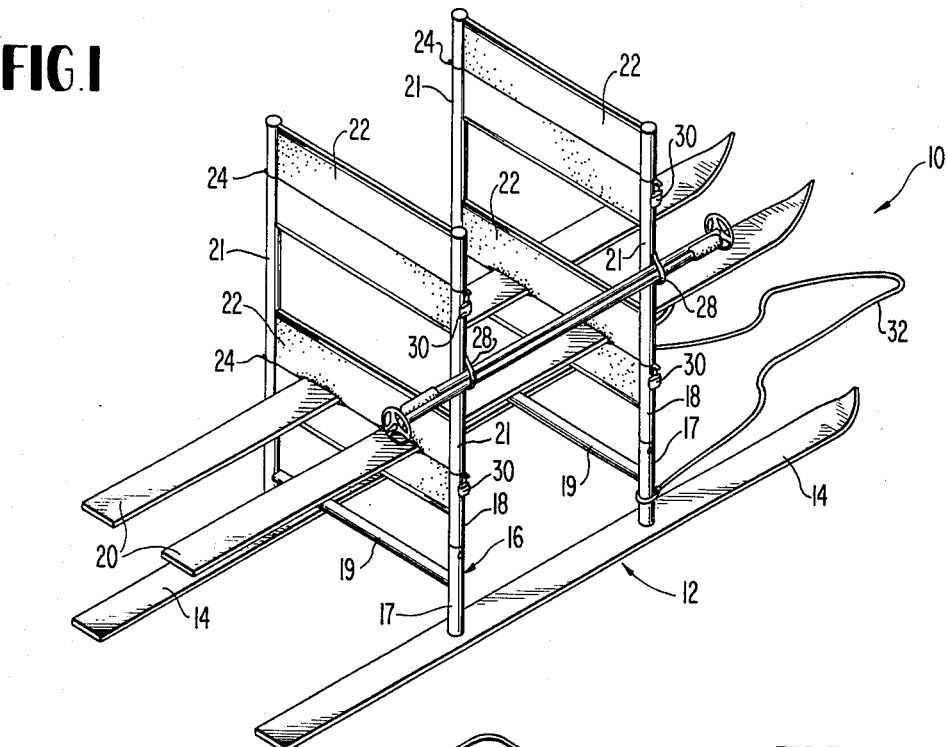
FIG.1
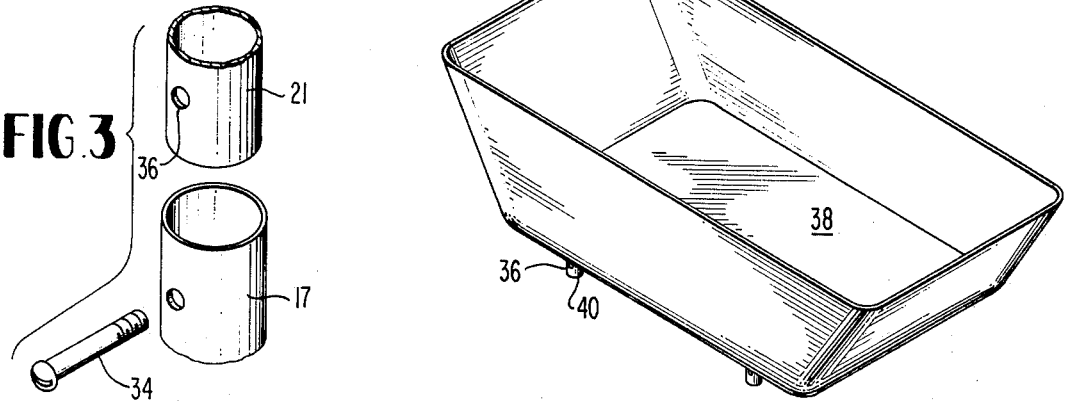
FIG.2
FIG.3
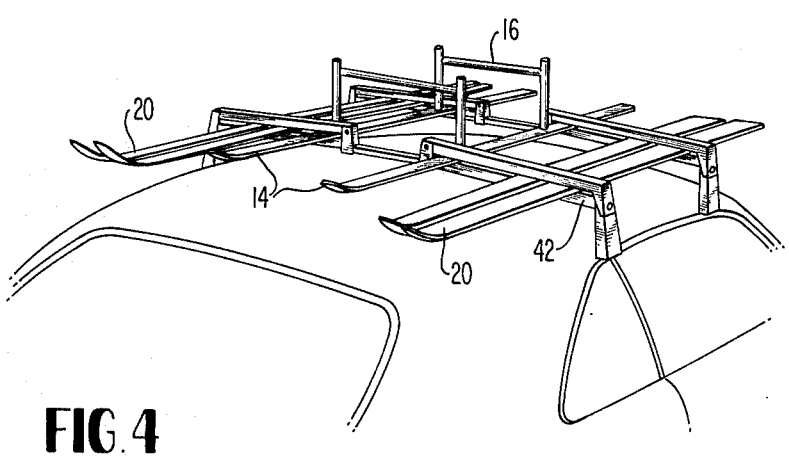
FIG.4

SKI CARRY

FIELD OF THE INVENTION

This invention relates to ski tow devices and has particular utility in transporting skis and ski poles in areas where travel by automobile is not practical.

BACKGROUND OF THE INVENTION

In the last few years, more and more people have become concerned with their health and keeping themselves physically fit. In order to maintain themselves in a physically fit condition, the American people have been engaged in an increasing number of sports such as jogging, tennis, golf or skiing. In particular, skiing has benefited from this physical fitness boom and many new ski facilities have been constructed and the existing ones have been expanded. However, this new influx of people have resulted in some parking facilities being built at a considerable distance from the ski area slopes. Therefore, when the skier parks his car, he is faced with a long trek to the ski slope and must carry his skis and ski poles on his shoulder. This would detract from enjoyment of skiing since once the skier reaches the ski lifts he is exhausted from physically carrying his equipment.

In U.S. Pat. No. 3,740,065, issued to Greene, a ski tow capable of supporting from 1 to 5 persons and which is drawn by a self-propelled vehicle, such as snowmobile, was disclosed for carrying skiers up slopes. The Greene device makes no provision for transporting just the skis and ski poles to the ski lifts and by its very design would be hard to maneuver in walkways and must utilize some sort of self-propelled vehicle to tow the device. Since crowded parking areas make travel by snowmobile impractical, the Greene device would have no application in transporting a pair or pair of skis from the parking area to the lift. Therefore, it appears that a device for transporting skis to and from cars to ski slopes is warranted.

SUMMARY OF THE INVENTION pairs

The present invention relates to a ski carry device which would have very practical use for veteran as well as occasional skiers and children. The ski carry consists of two runners which travel on ice or snow and it has an upright frame attached to the runners. This frame is adapted to receive a paired ski rack which has provisions for carrying skis and ski poles. The ski carrier can be transported to the skiing area, utilizing a standard cartop ski rack, with skis and poles in place. The ski racks on the ski carrier may, if desired, be removed from the upright frame and be placed in the trunk or back seat of the car. The skis themselves and the sled runners can then be transported on a standard cartop ski rack and when one arrives at the ski area, the ski carrier can easily be assembled.

This ski device is not limited only for transporting skis and ski poles to the ski area, but can be adapted to receive a box-like container which may be utilized as a sled for children or in transporting packages or other miscellaneous articles around a ski resort where vehicles have limited access and roads and walkways are snowpacked.

It is accordingly an object of the present invention to overcome the defects of the prior art as indicated above.

Another object of the present invention is to develop a ski carrier for use in ski areas.

A further object of the present invention is to develop a light-weight ski carrier which may be propelled by a single person.

A still further object of the present invention is to develop a ski carrier for transporting skis to and from ski areas.

Yet another object of the present invention is to develop a ski carrier for transporting packages and miscellaneous articles in a ski area.

Another object of the present invention is to develop a ski carrier for use as a sled for small children.

Still another object of the present invention is to develop a ski carrier which can be easily dismantled and transported to the ski area by automobile.

BRIEF DESCRIPTION OF THE DRAWING

The above and additional objects and advantages inherent in the present invention will become more apparent by reference to the description of an illustrated embodiment and the drawing thereof in which:

FIG. 1 is a perspective view of the ski carry with the ski racks in place;

FIG. 2 is a view of the package compartment;

FIG. 3 is a view of the securing device on the upright frame; and

FIG. 4 is a perspective view of the sled runners in place on a standard cartop ski rack.

DETAILED DESCRIPTION OF THE PREFERRED EMBODIMENT

A ski carry assembly, with the two ski racks attached thereto is best shown in FIG. 1. This ski carry consists of a base 12 comprising two sled runners 14 and a frame 16 consisting of four upright posts 17 and two horizontal bars 19. The runners 14 and the frame 16 can be constructed of any light-weight metal such as aluminum or of wood to enable the ski carry 10 to be easily maneuvered and also be impervious to cold temperatures and wind, to which the ski carry 10 will be subjected. Furthermore, this lightweight material allows the ski carry to be easily and manually propelled by one person.

A ski rack 18 comprising two supports 21 is removably attached to the four posts 17 of the ski frame 16. This ski rack 18 has a pair of ski holders 22 which may be constructed of rubber or other resilient material so as to enable pairs of skis 20 to be transported in the ski carry. As was true with the base, ski runners and frame, this ski rack 18 may be constructed of lightweight aluminum or wood or any other suitable material.

The ski holders 22 each have a hinge 24 between an upper and lower resilient material whereby, in order to allow the skis 20 to be inserted or removed, the ski holder can be opened for the insertion of the skis between the upper and lower resilient material. Although FIG. 1 depicts a two-tiered ski carry having hinges 24 on the same side of the ski rack 18, it should not be construed to be so limited, since the top hinge might be on the left side of the ski rack 18 and the bottom hinge might be on the right side or vice versa. To ensure the safety of the skis when ski carry 10 is left unattended, a padlock 30 is provided for each ski holder 22. A ski pole loop 28 is affixed to the sides of the supports 21 of the ski rack 18 to easily transport the ski poles. A rope 32 is attached to the front posts 17 of the frame 16 to enable the ski carry to be maneuvered by a single person.

The ski carry 10 is not limited in use for transporting only skis and ski poles, but may be utilized in transporting small children, packages or miscellaneous articles.

A box-like package container 38 is shown in FIG. 2, which consists of standard container such as a wheel barrow-shaped bowl including a substantially horizontal floor portion and having four package container supports 40, to provide for carrying packages or groceries. Moreover, this container 38 may be utilized by small children as a sled which can be pulled by an adult using rope 32.

FIG. 3 shows the fastening mechanism on the removable ski rack 18, it being understood that this securing mechanism has equal facility in conjunction with the package container 38 or any other like container. The four posts 17 of the ski frame 16 may be attached to the suppports 21 of the ski rack 18 by means of a screw and nut assembly. A hole 36 is provided in each arm of the support 21 and each arm is inserted into the ski frame 16 until its hole 36 is aligned with a hole in each one of the posts 17. A screw 34 is then inserted through the aligned holes and passes through to the other side where the whole assembly is tightened by use of a nut (not shown).

The ski carry can easily be transported to the ski area by use of an automobile and a standard cartop ski rack 42. As shown in FIG. 4, the skis 20 and the ski runners 14 in frame 16 are placed into any standard cartop ski rack. The ski racks 18 (which are smaller in width than standard cartop ski racks) or the package container 38 can be placed into the trunk or the back seat of the automobile, and when one arrives at the ski area the ski carry can easily be assembled by inserting the supports 21 or the package container supports 40 into the four posts 17 of the ski frame 16.

To facilitate its transportation and to increase its usefulness, this ski carry is modular and can be adapted to receive any number of different removable units containing four dependent posts which would engage the four upstanding posts 17 of the ski frame 16. FIG. 1 shows a ski carry which has provisions for 3-4 pairs of skis. It can be appreciated that each section of the ski rack 18 having ski holder 22 can be a separate unit with the top unit engaging the bottom unit in the same manner shown in FIG. 3. In this configuration, the ski carry may consist of only the bottom ski holder unit and may have any other modular unit containing four dependent posts engaging the top posts of the bottom ski holder unit, such as the package container 38. Furthermore, the top unit may consist of a seat or a pair of seats which may be utilized by children.

While this device has been described with particular refernce to its use as a ski carry, package container or sled, it should not be construed as so limited and may be utilized in many different situations. It will be obvious to one skilled in the art that various changes may be made without departing from the scope of the invention and the invention is not to be construed as limited to what is shown in the drawings and described in the specification.

What is claimed:

1. A modular tow device, adaptable to travel on snow, for the transportation of miscellaneous articles, comprising:
   two parallel runner means for allowing the device to travel on snow;
   a plurality of removable carrier means, each having depending posts; and
   frame means attached to said runner means for receiving and holding each said removable carrier means in place, one at a time, said frame means comprising upstanding posts, each connected at one end thereof to one of said runner means and adapted to removably receive one of said depending posts of each said removable carrier means at the other end, said upstanding posts and said depending posts being in alignment and adapted to be removably secured together, and horizontal bars connecting upstanding posts on opposite runners, whereby the relative positions of said upstanding posts are assured,
   wherein one of said removable carrier means is a rack means specifically adapted for carrying skis, said ski rack means comprising two supports each having said depending posts, and ski holders mounted between said depending posts of each of said supports, said ski holders on each of said supports being in alignment and adapted to hold skis to be transported by the tow device, and another of said removable carrier means is a container means for carrying packages, said package container means including a substantially horizontal floor portion on which the packages may be carried.

2. A tow device according to claim 1 wherein each of said ski holders includes a hinge between an upper and lower resilient material whereby the ski holder can be opened to insert the skis between the upper and lower resilient material.

3. A tow device in accordance with claim 1 wherein at least one of said removable carrier means of said plurality of removable carrier means includes receiving means thereon for receiving and holding one of the remaining said removable carrier means of said plurality of removable carrier means.

4. A tow device according to claim 3 wherein the said at least one of said removable carrier means which includes thereon said receiving means is a first said ski rack means, and said one of the remaining said removable carrier means is a second said ski rack means, whereby said second ski rack means may be mounted above said first ski rack means so that multiple pairs of skis may be carried simultaneously.

5. A tow device in accordance with claim 3 wherein said at least one of said removable carrier means which includes thereon said receiving means is said ski rack means, and said one of the remaining said removable carrier means is said package container means whereby said ski rack means and said package container means are adapted to be removably secured to each other and to said frame means.

6. A tow device in accordance with claim 1 wherein said runner means comprises two parallel sled runners.

* * * * *